Nov. 3, 1925.
J. W. LOBDELL
OIL SAVER
Filed Aug. 28, 1922
1,560,391
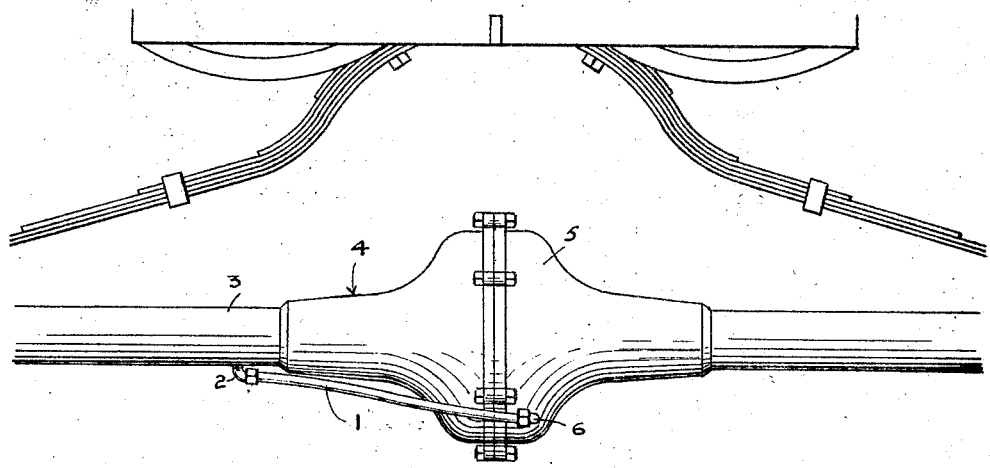
FIG. 1
FIG. 2
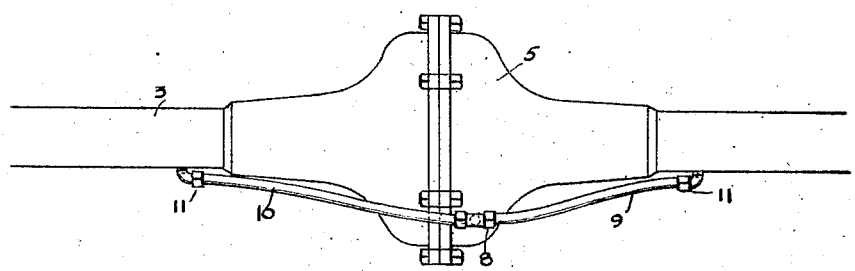
FIG. 3
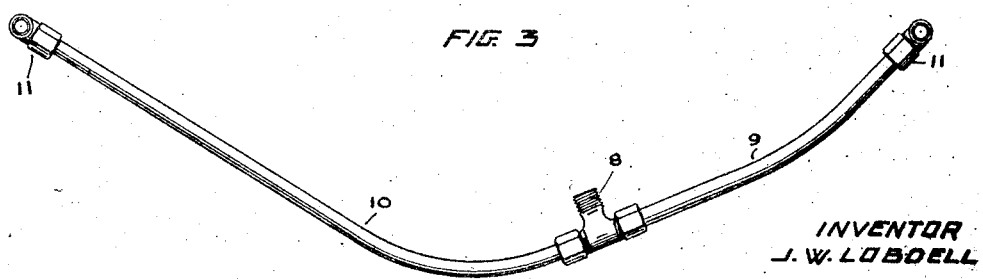
INVENTOR
J. W. LOBDELL
ATTYS.

Patented Nov. 3, 1925.

1,560,391

UNITED STATES PATENT OFFICE.

JESSE W. LOBDELL, OF LOS GATOS, CALIFORNIA.

OIL SAVER.

Application filed August 28, 1922. Serial No. 584,680.

*To all whom it may concern:*

Be it known that I, JESSE W. LOBDELL, a citizen of the United States, residing at Los Gatos, in the county of Santa Clara and State of California, have invented new and useful Improvements in Oil Savers, of which the folowing is a specification.

The present invention relates to improvements in automobiles and more particularly to an oil saving device which as an attachment for an automobile will prevent leakage of oil through the axle housings and thereby prevent waste of oil and the creation of an undesirable oily condition in and around the rear wheels.

The primary object of the invention is to provide a device which will cause oil, having flowed out of the differential housing into the axle housings or casings, to be delivered back to the differential housing rather than be permitted to flow out through the axle housings, the device being of simple and inexpensive construction and such that it may be readily and easily attached to various makes of automobiles without necessitating changing the construction of the latter.

The invention possesses other advantages and features some of which, with the foregoing will be set forth at length in the following description where I shall outline in full that form of the invention which I have selected for illustration in the drawings accompanying and forming a part of the present specification. In said drawings I have shown one form of the construction of my invention, but it is to be understood that I do not limit myself to such form since the invention as expressed in the claim may be embodied in a plurality of forms.

Refering to the drawing:

Fig. 1 represents a rear elevation of an automobile rear axle showing portions of the axle housings and the differential housing, also the device of my invention.

Fig. 2 represents a view similar to Fig. 1, but showing a slightly modified arrangement of the invention.

Fig. 3 represents a plan view of the device of the invention as shown in Fig. 2.

In carrying out the invention as particularly illustrated in the drawing, I employ a pipe or tube 1, one end of which is connected by a suitable fitting 2, with one of the housings 3 of an automobile rear axle, generally designated 4. The fitting 2 is tapped into the under side of the housing 3 at a point adjacent the connection of the housing with the differential housing 5. The other end of the pipe or tube 1 is connected by a similar fitting 6 with the differential housing 5 at a point near the lower side of the latter and in such manner that the tube or pipe will be inclined downwardly to the point of its connection with the differential housing. By this arrangement oil flowing out of the housing 5 into the axle housing 3 will, instead of passing out through the axle housing to the wheel and waste, drain through the fitting 2 and pipe 1 back to the differential housing, as shown in Fig. 1. The pipe 1 is connected to one of the axle housings only. In most makes of automobiles, owing to the construction of the differential, the oil has a tendency to drain out through one side of the differential housing into one of the axle housings.

To apply the device of my invention, it is only necessary to form two screw threaded openings, one in the axle housing and one in the differential housing and connect the pipe 1 by screwing the fittings 2 and 6 into said openings.

In Figs. 2 and 3, I have shown the arrangement providing for drainage of oil from both axle housings. In this arrangement I employ a T fitting 8, which is tapped into the differential housing and at its other ends connects with pipes or tubes 9 and 10. On the outer ends of the pipes 9 and 10 are fittings 11 which are connected with the axle housings on the lower sides of the latter near their inner ends. The pipes 9 and 10 are connected so as to incline downwardly towards the lower side of the differential housing. By this arrangement any oil which may run out of the differential housing and into the axle housings or casings will be readily drained out of the casings and directed back into the differential housing. With my invention a great deal of oil which ordinarily would be wasted by running out of the outer ends of the axle housings, will be saved and an oily and greasy condition around the hubs and spokes of the rear wheels will be prevented.

I claim:

A means for causing oil having flowed out of an automobile differential housing into the axle housing to be delivered back to the differential housing, which means includes a pipe located exteriorly of and connected with said housings and inclined from the point of its connection with the axle housing downwardly to the point of its connection with the differential housing.

JESSE W. LOBDELL.